United States Patent
Humer (10) Patent No.: US 6,955,397 B1
(45) Date of Patent: Oct. 18, 2005

(54) VEHICLE SEAT ASSEMBLY HAVING ACTIVE HEAD RESTRAINT SYSTEM

(75) Inventor: Mladen Humer, Eastpointe, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/950,711

(22) Filed: Sep. 27, 2004

(51) Int. Cl.⁷ .............................................. B60N 2/42
(52) U.S. Cl. .............................................. 297/216.12
(58) Field of Search ................. 297/216.12, 216.13, 297/216.14, 308, 408

(56) References Cited

U.S. PATENT DOCUMENTS

| | | | |
|---|---|---|---|
| 5,651,582 A | 7/1997 | Nakano | 297/216.13 |
| 5,673,972 A | 10/1997 | Dudash et al. | 297/378.12 |
| 5,722,722 A | 3/1998 | Massara | 297/216.13 |
| 5,772,280 A | 6/1998 | Massara | 297/216.12 |
| 5,779,263 A | 7/1998 | Lane, Jr. et al. | 280/730.2 |
| 5,868,466 A | 2/1999 | Massara et al. | 297/284.6 |
| 5,884,968 A | 3/1999 | Massara | 297/216.12 |
| 5,938,279 A | 8/1999 | Schubring et al. | 297/216.12 |
| 6,036,266 A | 3/2000 | Massara | 297/328 |
| 6,199,947 B1 | 3/2001 | Wiklund | 297/216.12 |
| 6,213,549 B1 | 4/2001 | Wieclawski | 297/216.13 |
| 6,340,206 B1 | 1/2002 | Andersson et al. | 297/216.14 |
| 6,398,299 B1 | 6/2002 | Angerer et al. | 297/216.12 |
| 6,416,125 B1 | 7/2002 | Shah et al. | 297/216.12 |
| 6,416,127 B1 | 7/2002 | Galbreath, Jr. et al. | 297/216.13 |
| 6,523,892 B1 * | 2/2003 | Kage et al. | 297/216.13 |
| 6,565,150 B2 | 5/2003 | Fischer et al. | 297/216.12 |
| 6,604,788 B1 | 8/2003 | Humer | 297/216.13 |
| 6,719,368 B1 * | 4/2004 | Neale | 297/216.14 |
| 6,749,256 B1 * | 6/2004 | Klier et al. | 297/216.12 |
| 6,779,840 B1 * | 8/2004 | Farquhar et al. | 297/216.12 |
| 6,789,845 B2 * | 9/2004 | Farquhar et al. | 297/216.12 |
| 6,837,541 B2 * | 1/2005 | Farquhar et al. | 297/216.13 |

* cited by examiner

Primary Examiner—Peter R. Brown
(74) Attorney, Agent, or Firm—Bliss McGlynn, P.C.; Bill Panagos (57) ABSTRACT

A vehicle seat assembly that includes a seatback frame, an upper armature including a head restraint, and a lower armature. The vehicle seat assembly also includes at least one first linkage that is moveably connected to the seatback frame, is operatively connected to the upper armature, and is operatively connected to the lower armature. The vehicle seat assembly further includes at least one second linkage that is moveably connected to the seatback frame and is operatively connected to the lower armature. The lower armature is operable to concurrently move each of the first linkage and the second linkage relative to the seatback frame in response to a predetermined force applied to the lower armature to thereby move the upper armature and move the head restraint toward the occupant.

19 Claims, 3 Drawing Sheets

VEHICLE SEAT ASSEMBLY HAVING ACTIVE HEAD RESTRAINT SYSTEM

BACKGROUND OF THE INVENTION

1. Field of the Invention

The present invention relates, generally, to a vehicle seat assembly, and more specifically to a vehicle seat assembly having an active head restraint system.

2. Description of the Related Art

Conventional vehicle seat designs of the type commonly found in the related art typically include a seatback assembly, a lower seat assembly, recliner mechanism, manual or power adjustment mechanism for adjusting a number of positions of either the seatback or lower seat assemblies, as well as a number of safety features including occupant restraint devices such as seatbelts. The seatback assembly also includes a headrest or head restraint that is typically mounted at the top or upper end of the seatback.

In the context of vehicle seat design, there is an ongoing effort to improve the safety of the vehicle occupant in the event of a rear end collision. More specifically, there continues to be an ongoing effort to provide safety mechanisms that reduce the chance of injury in the region of the passengers' neck. In the event of a rear end collision, the occupant is forced against the seat and can experience a large energy pulse. In such circumstances, there is often a separation between the head and neck area of the occupant and the head restraint. Depending on the force of the rear end collision, this separation can be quickly and violently closed by movement of the upper torso, neck, and head of the passenger toward the seatback in an event commonly known as "whiplash." Thus, there has been an ongoing effort to address this problem in the context of vehicle seating safety.

In the past, the head restraint was a relatively static device that was typically moveable up and down or slightly tiltable, but usually in connection with adjustments made for the comfort of any given occupant of the seat during normal driving conditions. However, in order to address the problems encountered during a rear end collision, dynamic or active head restraint mechanisms have been proposed in the related art.

For example, U.S. Pat. No. 5,938,279 issued to Schubring et al. and assigned to the assignee of the present invention discloses an active vehicle head restraint assembly that is designed to reduce the amount of separation between the occupant and the head restraint in the event of a rear end collision. The head restraint assembly includes an impact or target plate that is supported by the seatback frame in the general area corresponding to the thoracic or shoulder area of the occupant. The impact plate is pivotally mounted to a linkage that is connected to the head restraint. In the event of a rear end collision, the force of the occupant on the target plate actuates the linkage to cause the head restraint to move toward the head of the occupant, thereby reducing the amount of separation between the occupant and the head restraint.

While the active head restraint systems of the type known in the related art were an improvement over the previously known static head restraints, there remains a need in the art for systems that better absorb and dissipate the energy generated by the force acting on the seatback in the event of a rear end collision, especially at the pelvic and lumbar areas, which are generally remote from the head restraint.

U.S. Pat. No. 6,565,150, assigned to the assignee of the present invention, discloses a vehicle seat having an active head restraint that is designed to address this problem. More specifically, the seat has a pivotal support assembly that is mounted to the seatback frame and is operatively connected to the head restraint such that the head restraint moves toward the occupant in the event of a rear end collision. The pivotal support assembly includes a lower impact target that is located in the pelvic and lumbar regions to dissipate the forces that are first translated to the seatback in this area. The lower target is operatively connected to a reaction plate that is pivotally mounted to the seatback. In turn, the head restraint is mounted to the reaction plate.

While the dynamic head restraint systems known in the related art have generally worked for their intended purposes and have improved safety, there remains a need in the art for a vehicle seat assembly that more efficiently and more quickly transfers forces from the occupant to the head restraint system for more effective actuation of the head restraint toward the occupant during a collision. There also remains a need in the art for a vehicle seat assembly with an active head restraint system that is less expensive, lighter, and easier to assemble.

SUMMARY OF THE INVENTION

The disadvantages of the related art are overcome in the vehicle seat assembly of the present invention that includes a seatback frame, an upper armature having a head restraint, and a lower armature. The vehicle seat assembly also includes at least one first linkage that is moveably connected to the seatback frame, is operatively connected to the upper armature, and is operatively connected to the lower armature. The vehicle seat assembly further includes at least one second linkage that is moveably connected to the seatback frame and is operatively connected to the lower armature. The lower armature is operable to concurrently move each of the first linkage and the second linkage relative to the seatback frame in response to a predetermined force applied to the lower armature to thereby move the upper armature and move the head restraint toward the occupant.

In summary, the vehicle seat assembly of the present invention provides an active head restraint system that is more responsive to forces that are imparted to the seatback by the occupant. The vehicle seat assembly more efficiently transfers forces from the occupant to the head restraint such that the head restraint moves toward the occupant more quickly. As such, the vehicle seat assembly better supports the occupant during a rear end collision and makes injury less likely. Finally, the vehicle seat assembly of the present invention addresses these specific problems in a system that is relatively efficient, lightweight, robust, and cost effective.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
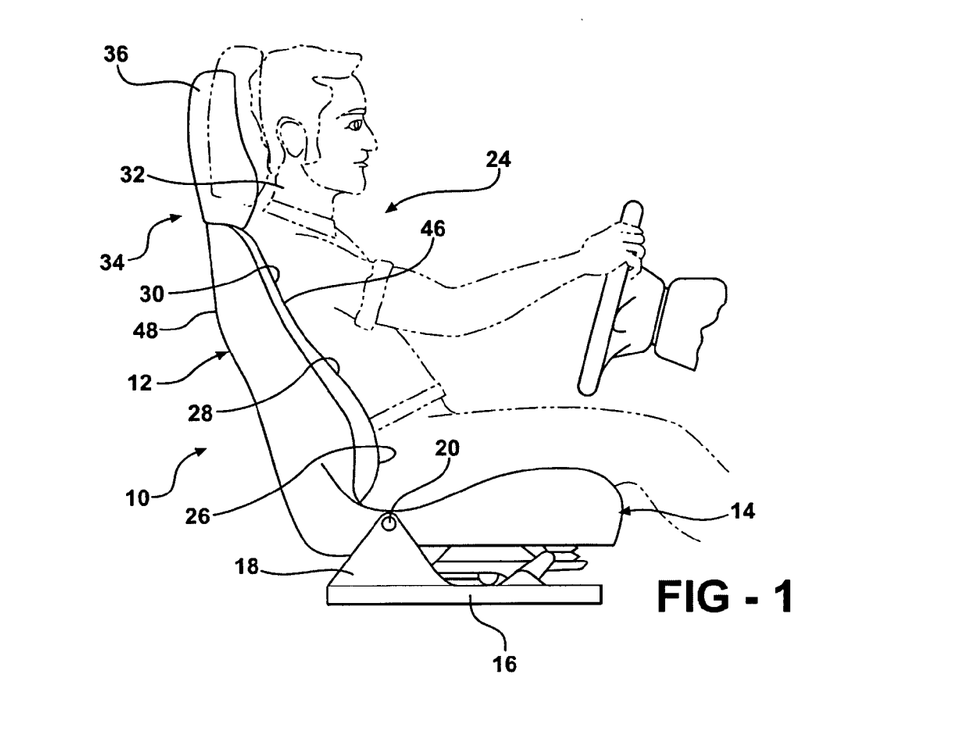
FIG. 1 is an elevational side view of a vehicle seat assembly of the present invention illustrated in relation to a schematically shown occupant of the vehicle seat assembly.

Referring now to the drawings, where like numerals are used to designate like structure throughout the Figures, a vehicle seat assembly of the present invention is generally indicated at 10 in FIG. 1. The vehicle seat assembly 10 includes a seatback, generally indicated at 12, and a lower seat assembly, generally indicated at 14, that is supported on a seat track mechanism 16, as is commonly known in the art. The seatback 12 may be pivotally connected to the lower seat assembly 14 by means of a bracket 18 at pivot point 20 that forms a part of the seat track mechanism 16. In this way, the vehicle seat assembly 10 may be adapted to recline or adjust in a number of ways that are commonly known in the art. In addition to these common elements, the seat assembly 10 of the present invention may include various controls and restraint systems, such as seatbelts, etc. that are not shown, but that are well known in the art.

An occupant, generally indicated at 24, is shown in phantom seated upon the vehicle seat assembly 10. The occupant 24 has a pelvic area 26, which is proximate to both the lower seat assembly 14 and to the lower end of the seatback 12. The occupant 24 also has a lumbar area 28 supported above the pelvic area 26, and a shoulder or thoracic area 30 supported above the lumbar area 28. Furthermore, the occupant 24 has a head and neck area 32 supported above the thoracic area 30.

The vehicle seat assembly 10 also includes an active head restraint system, generally indicated at 34, operatively supported by the seatback 12. The active head restraint system 34 includes a head restraint 36 proximate to the head and neck area 32 of the occupant 24. The head restraint 36 can be positioned in an upright position (shown in solid in FIG. 1) and can be positioned in an operative position (shown in phantom in FIG. 1), wherein the head restraint 36 is pivoted forward and upward, toward the head and neck area 32 of the occupant 24. In the event of a rear end collision, the forces that are generated can cause the occupant 24 to be driven generally rearward against the seatback 12. As will be described in greater detail below, forces from the occupant 24 imparted to the seatback 12 are transferred through the active head restraint system 34 to ultimately move the head restraint 36 from the upright position to the operative position toward the head and neck area 32 of the occupant 24. This movement of the head restraint 36 better supports the head and neck area 32 of the occupant 24 during the rear end collision thereby reducing the likelihood of a whiplash injury.

Figure 2:
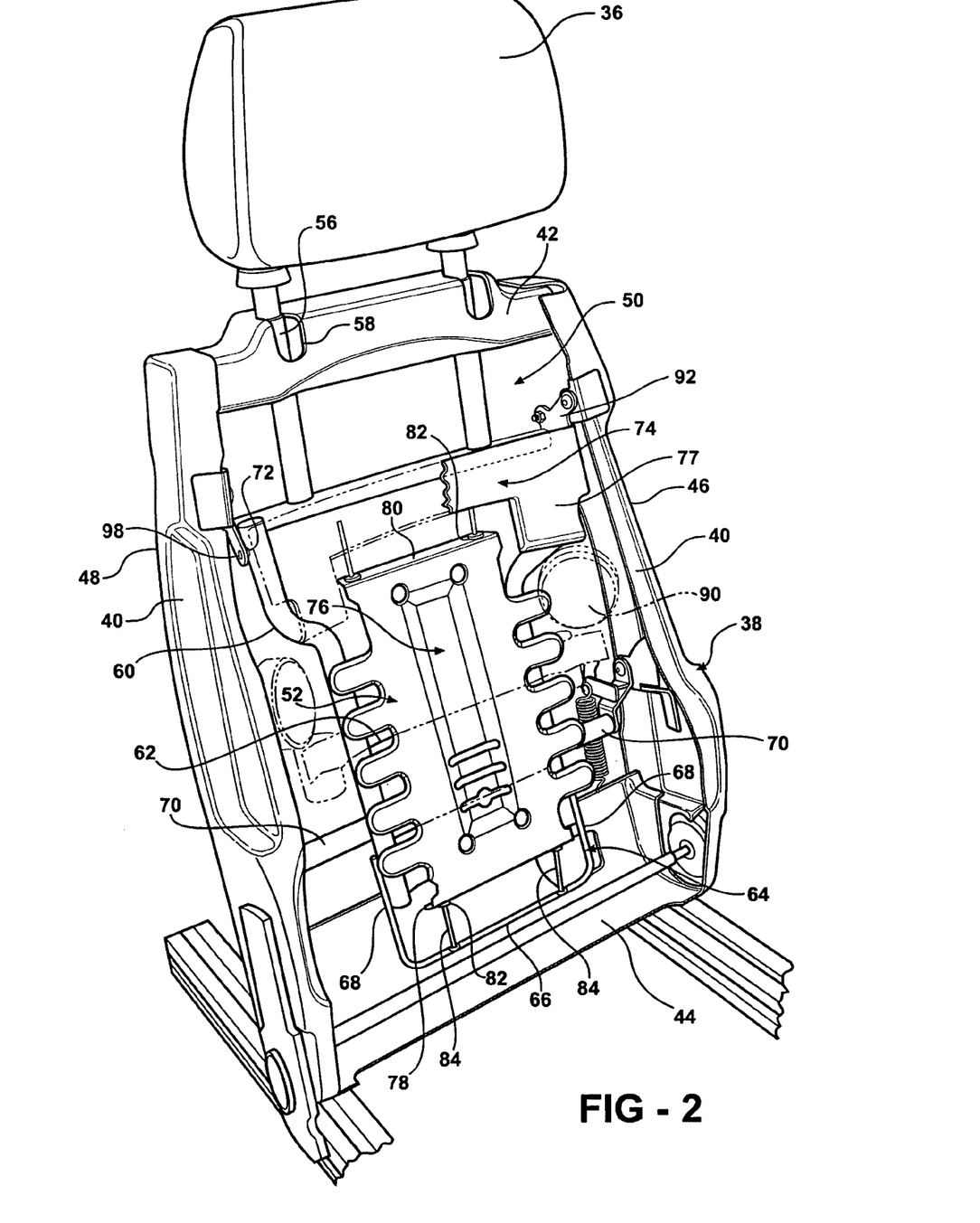
FIG. 2 is a front perspective view of one embodiment of the vehicle seat assembly of the present invention with an active head restraint system.
Figure 3:
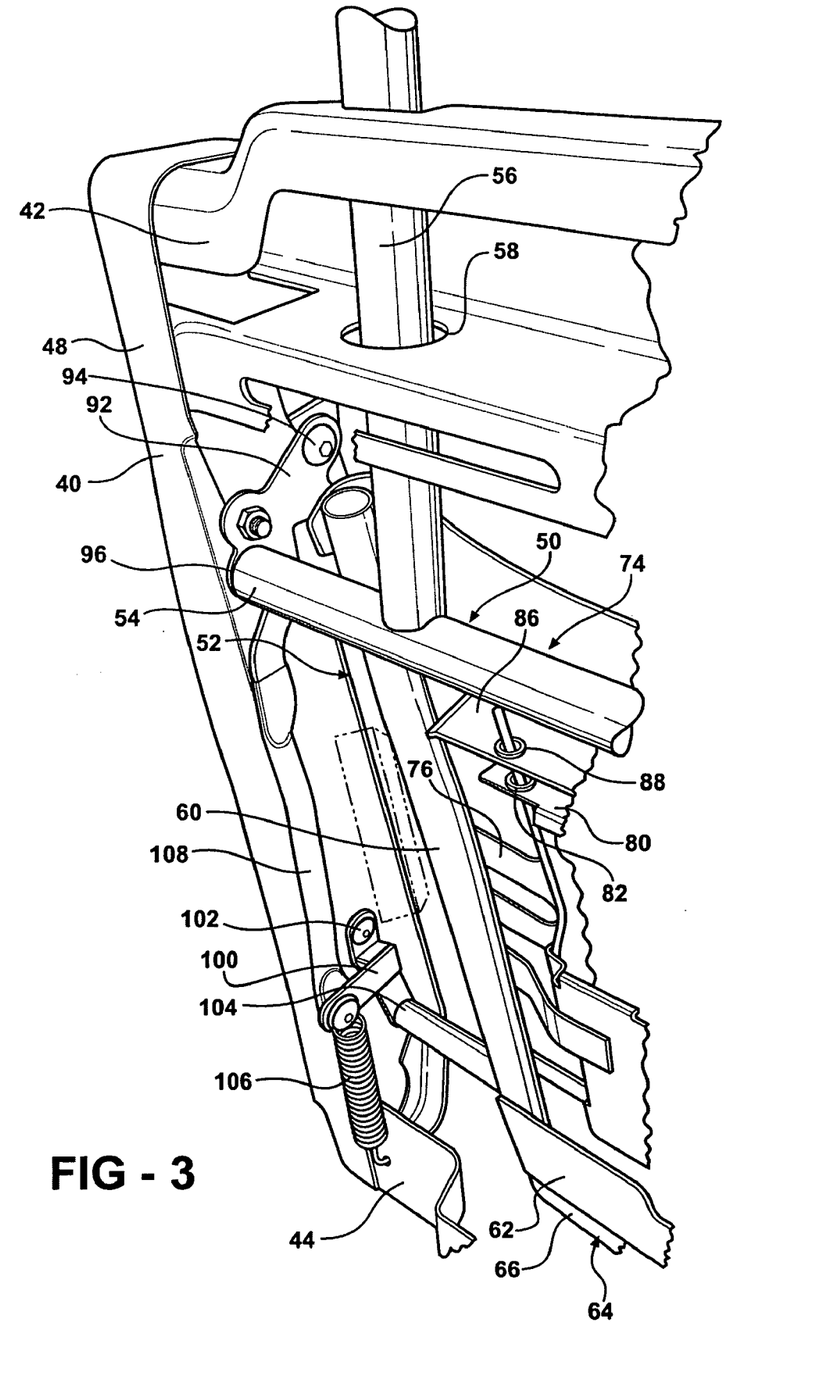
FIG. 3 is a rear perspective view of the vehicle seat assembly shown in FIG. 2.
Figure 4:
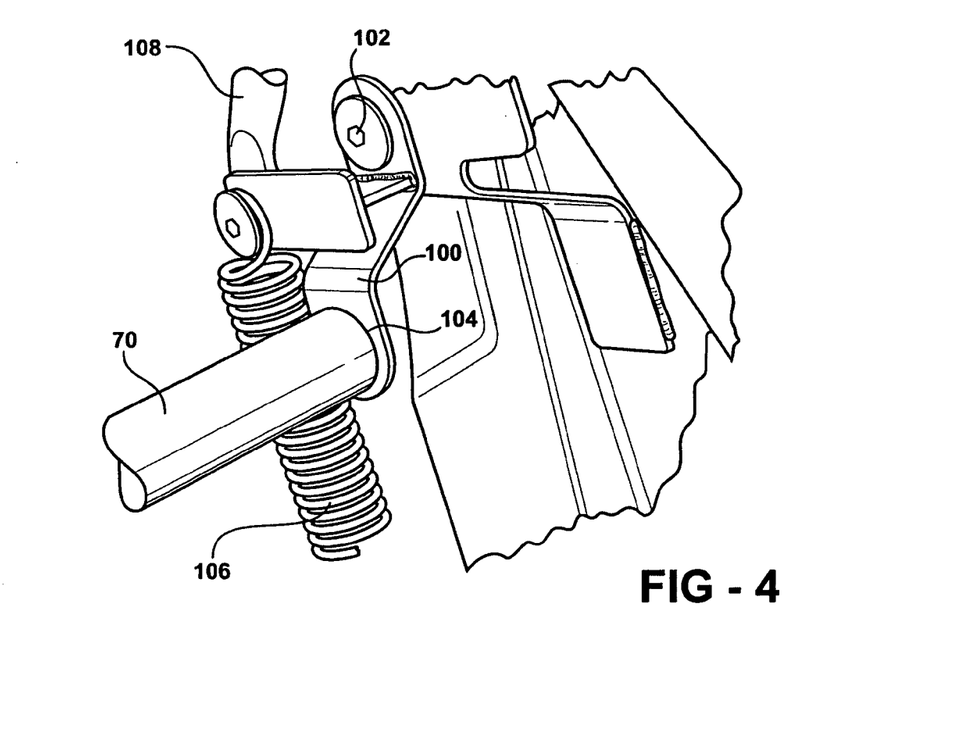
FIG. 4 is a side perspective view of the lower end of the vehicle seat assembly shown in FIG. 2.

Referring to FIGS. 2 through 4, one embodiment of the seatback 12 of the vehicle seat assembly 10 is shown in more detail. The vehicle seat assembly 10 includes a seatback frame, generally indicated at 38. The seatback frame 38 includes a pair of side frame members 40 that are disposed in a generally vertical orientation and are spaced horizontally relative to one another. The seatback frame 38 also includes upper and lower cross members 42, 44, respectively, that extend horizontally between the pair of side frame members 40. As such, the seatback frame 38 defines a forward side 46 and a rearward side 48 of the seatback 12. The seatback frame 38 may have a "unibody" construction wherein the side frame members 40 as well as the upper and lower cross member 42, 44 are integrally formed. In addition, the seatback frame 38 may be assembled from separate components making up the side frame members 40 and upper and lower cross members 42, 44 that are then welded or otherwise permanently fixed to each other. Thus, and from the description that follows, those having ordinary skill in the art will appreciate that a number of different means of operatively interconnecting the components of the seatback frame 38 may be employed without departing from the scope of the present invention.

The active head restraint system 34 generally includes an upper armature, generally indicated at 50, and a lower armature, generally indicated at 52. The upper armature 50 includes the head restraint 36, which is mounted thereon in a manner to be described in greater detail below. The head restraint 36 is mounted so as to be disposed proximate to the head and neck area 32 of the occupant 24. Both the upper and lower armatures 50, 52 are moveably supported by the seatback frame 38, and the lower armature 52 is disposed below the upper armature 50. As will be described in greater detail below, the lower armature 52 is operable to move in response to a predetermined force applied to the lower armature 52. This movement of the lower armature 52 causes movement of the upper armature 50, which moves the head restraint 36 toward the occupant 24. As such, the head and neck area 32 of the occupant 24 is better supported during a rear end collision.

One embodiment of the upper armature 50 is illustrated in FIGS. 2 and 3. The upper armature 50 includes a cross bar 54 (FIG. 3) and a plurality of posts 56. The cross bar 54 extends transversely between both side frame members 40, and the posts 56 extend transversely from the cross bar 54 toward the upper cross member 42 of the seatback frame 38. The upper cross member 42 of the seatback frame 38 includes a plurality of apertures 58 through which the posts 56 extend. In the embodiment shown, the apertures 58 are elongate and disposed near the forward side 46 of the seatback 12 so as to allow forward swinging movement of the posts 56 toward the occupant 24. The vehicle seat assembly 10 can include a bushing (not shown) or other similar component near the apertures 58 that facilitate swinging movement of the posts 56 toward the occupant 24. In one embodiment, the cross bar 54 and the posts 56 are metal tubes and the posts 56 are fixed to the cross bar 54 with welds or other suitable means. However, the cross bar 54 and posts 56 could be constructed in any other suitable way without departing from the scope of the invention.

The head restraint 36 is mounted to an upper end of each post 56 such that movement of the cross bar 54 coincidentally moves the head restraint 36. The head restraint 36 can be rigidly mounted to the upper end of the posts 56 or the head restraint 36 could be moveably mounted to the posts 56 in a known manner to allow the head restraint 36 to be tilted, raised, and/or lowered relative to the posts 56 without departing from the scope of the invention.

Referring to FIGS. 2 through 4, one embodiment of the lower armature 52 is shown. The lower armature 52 includes a plurality of primary supports 60, a first stiffener 62 (shown partially in phantom in FIG. 2), and a second stiffener, generally indicated at 64 (FIG. 2). Both the first and second stiffeners 62, 64 interconnect and mechanically support the primary supports 60. The primary supports 60 and the stiffeners 62,64 are preferably fixed together by welds, but can be of a unibody construction or other suitable construction without departing from the scope of the invention. The primary supports 60 are each elongate and extend transversely between the upper and lower cross members 42, 44 of the seatback frame 38. In the embodiment shown, the first stiffener 62 is a plate extending transversely between each of the primary supports 60. The second stiffener 64 is a bent rod with a middle portion 66 disposed parallel to the lower cross member 44 and below the primary supports 60 and ends 68 extending transversely from opposite ends of the middle portion 66 so as to fixedly attach to the lower terminal ends of the primary supports 60.

The lower armature 52 also includes a plurality of mounts 70 as shown in FIGS. 2 and 4. Each of the mounts 70 are connected to one of the primary supports 60 adjacent the first and second stiffeners 62, 64 and extend toward one of the side frame members 40. The mounts 70 can be fixed to the primary supports 60 by welds or other suitable means. Furthermore, the lower armature 52 includes a plurality of apertures 72 (FIG. 2), each formed through one of the primary supports 60 at an end opposite to that of the second stiffener 64. As will be described in greater detail below, the lower armature 52 is moveably supported on the seatback frame 38 via the mounts 70 and the apertures 72.

As shown in FIG. 2, the vehicle seat assembly 10 also includes at least one, and preferably, a plurality of impact bodies 74, 76. In the embodiment shown, the vehicle seat assembly 10 includes a first impact body, generally indicated at 74 and a second impact body, generally indicated at 76. The first impact body 74 is operatively mounted to the lower armature 52 and is operable to move the lower armature 52 in response to a predetermined force applied thereto. Likewise, the second impact body 76 is operatively mounted to the lower armature 52 and is operable to move the lower armature 52 in response to a predetermined force applied thereto. Those having ordinary skill in the art will appreciate that the vehicle seat assembly 10 could include any number of impact bodies mounted to the lower armature 52 in any appropriate location without departing from the scope of the invention.

In the embodiment shown, the first impact body 74 extends transversely between each of the primary supports 60. The first impact body 74 also includes at least one, and preferably, a plurality of enlarged portions 77 (FIG. 2) that increase the surface area of the first impact body 74 and allow the first impact body 74 to more readily receive force from the occupant 24. The enlarged portions 77 are disposed at opposite ends of the first impact body 74 in the embodiment shown. The first impact body 74 and the enlarged portions 77 can be fixed to primary supports 60 of the lower armature 52 by welds or other suitable manner. The first impact body 74 can be curved slightly toward the rearward side 48 to make it more comfortable to sit against.

The second impact body 76 is disposed between the primary supports 60 near the forward side 46 of the seatback 12. The second impact body 76 is mounted to the lower armature 52. More specifically, the second impact body 76 includes a lower flange 78 and an upper flange 80 (FIG. 2), each of which extends toward the rearward side 48 of the seatback 12. The lower flange 78 and the upper flange 80 each include a plurality of apertures 82 formed therein. As shown in FIG. 2, the vehicle seat assembly 10 also includes a plurality of rods 84, each extending through one of the apertures 82 in the upper flange 80 and one of the apertures 82 in the lower flange 78. Each rod 84 is also connected to the second stiffener 64 to thereby interconnect the second impact body 76 and the lower armature 52. The rods 84 can be fixed to the second stiffener 64 by welds or other suitable manner. In the embodiment shown, the first impact body 74 includes a flange 86 (FIG. 3) that extends toward the rearward side 48 and includes a plurality of apertures 88 through which the rods 84 also extend for further support of the second impact body 76. Those having ordinary skill in the art will appreciate, however, that the second impact body 76 could be directly connected to the primary supports 60 and take the place of the first stiffener 62 without departing from the scope of the invention.

In one preferred embodiment, the vehicle seat assembly 10 includes an adjustment mechanism 90 (shown in phantom) operable to adjust the height and/or curvature of the second impact body 76 such that the second impact body 76 is comfortable to sit against. Those having ordinary skill in the art will appreciate, however, that second impact body 76 could be nonadjustable without departing from the scope of the invention.

In the embodiment shown, the second impact body 76 is disposed adjacent the lower cross member 44 so as to be disposed proximate to the pelvic and lumbar areas 26, 28 of the occupant 24. Also, the first impact body 74 is disposed between the second impact body 76 and the upper armature 50 so as to be disposed proximate to the thoracic area 30 of the occupant 24. Thus, in the event of a rear end collision, the pelvic and lumbar areas 26, 28 of the occupant 24 can apply force to the second impact body 76, and the thoracic area 30 of the occupant 24 can apply force to the first impact body 74. Upon receiving these forces, the first and second impact bodies 74, 76 move the lower armature 52, and as will be described in greater detail below, this causes the upper armature 50 to move and ultimately moves the head restraint 36 toward the occupant 24.

As shown in FIGS. 2 and 3, the vehicle seat assembly 10 further includes at least one, and preferably, a plurality of first linkages 92. Each of the first linkages 92 is moveably connected to the seatback frame 38, is operatively connected to the upper armature 50, and is operatively connected to the lower armature 52. More specifically, in the embodiment shown, each of the first linkages 92 is pivotally connected to one of the side frame members 40 of the seatback frame 38 at a first coupling point 94 (FIG. 3). Moreover, each of the first linkages 92 is fixedly connected to the upper armature 50 at a second coupling point 96 (FIG. 3). Also, each of the first linkages 92 is pivotally connected to the primary supports 60 of the lower armature 52 at a third coupling point 98 (FIG. 2). Fasteners, bearings, or other suitable means establish the pivotal connection between the side frame members 40 and the first linkages 92 at the first coupling point 94. The cross bar 54 of the upper armature 50 is welded, fastened, or is otherwise suitably fixed to the first linkages 92 to establish the second coupling point 96. Moreover, fasteners, bearings, or other suitable means establish the pivotal connection between the first linkages 92 and the primary supports 60 at the third coupling point 98. In the embodiment shown, the apertures 72 formed in the primary supports 60 are used to attach fasteners, bearings, or other suitable hardware to the lower armature 52 at the third coupling point 98. As will be described in greater detail below, the first linkages 92 moveably mount the upper and lower armatures 50, 52 onto the seatback frame 38.

Additionally, the vehicle seat assembly 10 includes at least one, and preferably, a plurality of second linkages 100 (FIG. 4). Each of the first linkages 100 is moveably connected to the seatback frame 38 and is operatively connected to the lower armature 52. More specifically, in the embodiment shown, each of the second linkages 100 is pivotally connected to one of the side frame members 40 of the seatback frame 38 at a fourth coupling point 102 (FIG. 4). Moreover, each of the second linkages 100 is pivotally connected to the mounts 70 of the lower armature 52 at a fifth coupling point 104 (FIG. 4). Fasteners, bearings, or other suitable means establish the pivotal connections at the fourth and fifth coupling points 102, 104. As will be described in greater detail below, the second linkages 100 moveably mount the lower armature 52 onto the seatback frame 38.

In the preferred embodiment, the first coupling point 94 and the third coupling point 98 are disposed in spaced relation relative to each other. Likewise the fourth coupling point 102 and the fifth coupling point 104 are preferably disposed in spaced relation relative to each other. As such, the first linkage 92, the second linkage 100, and the lower armature 52 are able to freely move relative to each other and are able to freely move relative to the seatback frame 38.

Furthermore, in the preferred embodiment, the vehicle seat assembly 10 includes at least one, and preferably, a plurality of biasing members 106 as shown in FIG. 4. Each biasing member 106 interconnects the seatback frame 38 and one of the first and second linkages 92, 100 and is operable to bias the head restraint 36 toward the upright position. In the embodiment shown, each of the biasing members 106 is connected to one of the side frame members 40 and to one of the second linkages 100. As such, the biasing members 106 provide resistance to the lower armature 52 from moving relative to the seatback frame 38. In the embodiment shown, the biasing member 106 is a coiled extension spring, but the biasing member 106 could be any other suitable member, such as a torsion spring, without departing from the scope of the invention.

In the event of a rear end collision, the occupant 24 is driven into the seatback 12 and can apply a force to either one or both of the first impact body 74 and second impact body 76. Forces transfer to the primary supports 60 of the lower armature 52. The primary supports 60 of the lower armature 52 move relative to the seatback frame 38 in response to the force applied to the lower armature 52 from the first and/or second impact bodies 76. This motion pivotally moves each of the first linkages 92 and second linkages 100 concurrently about the first coupling points 94 and fourth coupling points 102, respectively, relative to the seatback frame 38. Pivotal movement of the first linkages 92 moves the cross bar 54 of the upper armature 50, and this ultimately moves the head restraint 36 toward the head and neck area 32 of the occupant 24. As such, the head and neck area 32 of the occupant 24 is better supported during a rear end collision and injury is less likely to occur.

After the lower armature 52 has moved, the biasing members 106 bias the linkages 100 downward toward the lower cross member 44, thereby re-aligning lower armature 52 with the side fame members 40, and the lower armature 52 acts on the first linkages 92 to return the upper armature 50 and the head restraint 36 to the upright position. The biasing members 106 also inhibit the lower armature 52 from unnecessarily moving when lower levels of force are applied from the occupant 24, such as when the occupant simply leans back in the vehicle seat assembly 10. Preferably, the stiffness of the biasing members 106 is adjusted such that only forces exceeding a predetermined level will cause the lower armature 52 to actuate. The predetermined level of force is preferably selected based upon the forces involved in an average rear end collision.

In one embodiment, the vehicle seat assembly 10 includes at least one, and preferably, a plurality of drag links 108 (FIG. 3) interconnecting the first linkages 92 and the second linkages 94. For instance, in the embodiment shown, each drag link 108 is pivotally connected to one of the first linkages 92, extends generally parallel with the primary supports 60, and is pivotally connected to one of the second linkages 100. The drag links 108 provide added stability to the lower armature 52 as it moves because the drag links 108 provide an additional means of interconnecting the first linkages 92 and the second linkages 100.

In summary, the vehicle seat assembly 10 of the present invention provides an active head restraint system 34 that is more responsive to forces that are imparted to the seatback 12 by the occupant 24. Because of the concurrent movement of the linkages 92, 100, the lower armature 52 moves toward the rearward side 48 of the seatback 12 in the same general direction of movement as the occupant 24. As such, the vehicle seat assembly 10 more efficiently transfers forces from the occupant 24 to the head restraint 36 such that the head restraint 36 moves toward the occupant 24. As such, the vehicle seat assembly 10 better supports the occupant 24 during a rear end collision and makes injury less likely. Finally, the vehicle seat assembly 10 of the present invention addresses these specific problems in a system that is relatively efficient, lightweight, robust, and cost effective.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A vehicle seat assembly comprising:
    a seatback frame;
    an upper armature including a head restraint;
    a lower armature;
    at least one first linkage moveably connected to said seatback frame, operatively connected to said upper armature, and operatively connected to said lower armature;
    at least one second linkage moveably connected to said seatback frame and operatively connected to said lower armature; and
    at least one drag link operatively interconnecting said first linkage and said second linkage;
    wherein said lower armature is operable to concurrently move each of said first linkage and said second linkage relative to said seatback frame in response to a predetermined force applied to said lower armature to thereby move said upper armature and move said head restraint toward the occupant.

2. A vehicle seat assembly as set forth in claim 1, wherein said drag link is pivotally connected to said first linkage and is pivotally connected to said second linkage.

3. A vehicle seat assembly as set forth in claim 1, wherein said upper armature is fixedly connected to said first linkage.

4. A vehicle seat assembly as set forth in claim 1, wherein said lower armature is pivotally connected to said first linkage and is pivotally connected to said second linkage.

5. A vehicle seat assembly as set forth in claim 1, wherein said first linkage is moveably connected to said seatback frame at a first coupling point, is operatively connected to said upper armature at a second coupling point, and is operatively connected to said lower armature at a third coupling point, wherein said first coupling point and said third coupling point are disposed in spaced relation relative to each other.

6. A vehicle seat assembly as set forth in claim 1, wherein said second linkage is moveably connected to said seatback frame at a fourth coupling point, and is operatively connected to said lower armature at a fifth coupling point, wherein said fourth coupling point and said fifth coupling point are disposed in spaced relation relative to each other.

7. A vehicle seat assembly as set forth in claim 1, further including at least one impact body operable to move said lower armature in response to a predetermined force applied to said impact body thereby moving said head restraint toward the occupant.

8. A vehicle seat assembly as set forth in claim 7 including a first impact body and a second impact body, each operatively mounted to said lower armature such that said first impact body is disposed between said upper armature and said second impact body.

9. A vehicle seat assembly as set forth in claim 8, wherein said first impact body includes at least one enlarged portion that increases surface area of said first impact body.

10. A vehicle seat assembly as set forth in claim 1, further including at least one biasing member interconnecting said seatback frame and one of said first linkage and said second linkage, said biasing member operable to bias said head restraint toward an upright position.

11. A vehicle seat assembly comprising:
  a seatback frame;
  an upper armature including a head restraint;
  a lower armature;
  at least one first linkage moveably connected to said seatback frame at a first coupling point, operatively connected to said upper armature at a second coupling point, and operatively connected to said lower armature at a third coupling point, wherein said first coupling point and said third coupling point are disposed in spaced relation relative to each other; and
  at least one second linkage moveably connected to said seatback frame at a fourth coupling point and operatively connected to said lower armature at a fifth coupling point, wherein said fourth coupling point and said fifth coupling point are disposed in spaced relation relative to each other;
  wherein said lower armature is operable to concurrently move each of said first linkage and said second linkage relative to said seatback frame in response to a predetermined force applied to said lower armature to thereby move said upper armature and move said head restraint toward the occupant.

12. A vehicle seat assembly as set forth in claim 11, further including at least one drag link operatively interconnecting said first linkage and said second linkage.

13. A vehicle seat assembly as set forth in claim 12, wherein said drag link is pivotally connected to said first linkage and is pivotally connected to said second linkage.

14. A vehicle seat assembly as set forth in claim 11, wherein said upper armature is fixedly connected to said first linkage at said second coupling point.

15. A vehicle seat assembly as set forth in claim 11, wherein said lower armature is pivotally connected to said first linkage at said third coupling point and is pivotally connected to said second linkage at said fifth coupling point.

16. A vehicle seat assembly as set forth in claim 11, further including at least one impact body operable to move said lower armature in response to a predetermined force applied to said impact body, thereby moving said head restraint toward the occupant.

17. A vehicle seat assembly as set forth in claim 16 including a first impact body and a second impact body, each operatively mounted to said lower armature such that said first impact body is disposed between said upper armature and said second impact body.

18. A vehicle seat assembly as set forth in claim 17, wherein said first impact body includes at least one enlarged portion that increases surface area of said first impact body.

19. A vehicle seat assembly as set forth in claim 11, further including at least one biasing member interconnecting said seatback frame and one of said first linkage and said second linkage, said biasing member operable to bias said head restraint toward an upright position.

* * * * *

UNITED STATES PATENT AND TRADEMARK OFFICE
CERTIFICATE OF CORRECTION

PATENT NO. : 6,955,397 C1
APPLICATION NO. : 90/011745
DATED : June 15, 2011
INVENTOR(S) : Humer It is certified that error appears in the above-identified patent and that said Letters Patent is hereby corrected as shown below:

Title Page, Item (73)

Delete:

"Assignee: JPMorgan Chase Bank, N.A., Houston, TX (US)"

And insert:

--Assignee: Lear Corporation, Southfield, MI (US)--

Signed and Sealed this
Eighteenth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 6,955,397 C1  
APPLICATION NO. : 90/011745  
DATED : February 8, 2013  
INVENTOR(S) : Humer It is certified that error appears in the above-identified patent and that said Letters Patent is hereby corrected as shown below:

In the Claims:

Column 1, Line 47:

Insert -- 6. A vehicle seat assembly as set forth in claim [1] 5, wherein said second linkage is moveably connected to said seatback frame at a fourth coupling point, and is operatively connected to said lower armature at a fifth coupling point, wherein said fourth coupling point and said fifth coupling point are disposed in spaced relation relative to each other. --

Signed and Sealed this
Twentieth Day of August, 2013

Teresa Stanek Rea
*Acting Director of the United States Patent and Trademark Office*

Disclaimer

6,955,397 B1 — Mladen Humer. VEHICLE SEAT ASSEMBLY HAVING ACTIVE HEAD RESTRAINT SYSTEM. Patent dated October 18, 2005. Disclaimer filed April 13, 2015, by the assignee, Lear Corporation.

Hereby disclaim complete claims 11, 16, 45, 50, 51, 63 and 66 of said patent.

*(Official Gazette, November 10, 2015)*

(12) EX PARTE REEXAMINATION CERTIFICATE (9506th)
United States Patent
Humer (10) Number: US 6,955,397 C1
(45) Certificate Issued: Feb. 8, 2013

(54) VEHICLE SEAT ASSEMBLY HAVING ACTIVE HEAD RESTRAINT SYSTEM

(75) Inventor: Mladen Humer, Eastpointe, MI (US)

(73) Assignee: JPMorgan Chase Bank, N.A., Houston, TX (US)

Reexamination Request:
No. 90/011,745, Jun. 15, 2011

Reexamination Certificate for:
| | |
|---|---|
| Patent No.: | 6,955,397 |
| Issued: | Oct. 18, 2005 |
| Appl. No.: | 10/950,711 |
| Filed: | Sep. 27, 2004 |

(51) Int. Cl.
*B60N 2/42* (2006.01)
(52) U.S. Cl. .................................................. 297/216.12
(58) Field of Classification Search .......................... None
See application file for complete search history.

(56) References Cited

To view the complete listing of prior art documents cited during the proceeding for Reexamination Control Number 90/011,745, please refer to the USPTO's public Patent Application Information Retrieval (PAIR) system under the Display References tab.

*Primary Examiner* — Jeffrey R Jastrzab (57) ABSTRACT

A vehicle seat assembly that includes a seatback frame, an upper armature including a head restraint, and a lower armature. The vehicle seat assembly also includes at least one first linkage that is moveably connected to the seatback frame, is operatively connected to the upper armature, and is operatively connected to the lower armature. The vehicle seat assembly further includes at least one second linkage that is moveably connected to the seatback frame and is operatively connected to the lower armature. The lower armature is operable to concurrently move each of the first linkage and the second linkage relative to the seatback frame in response to a predetermined force applied to the lower armature to thereby move the upper armature and move the head restraint toward the occupant.

US 6,955,397 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 10 and 19 are cancelled.

Claims 1 and 11 are determined to be patentable as amended.

Claims 2-9 and 12-18, dependent on an amended claim, are determined to be patentable.

New claims 20-70 are added and determined to be patentable.

1. A vehicle seat assembly comprising:
a seatback frame;
an upper armature including a head restraint;
a lower armature;
at least one first linkage moveably connected to said seatback frame, operatively connected to said upper armature, and operatively connected to said lower armature;
at least one second linkage moveably connected to said seatback frame and operatively connected to said lower armature; [and]
at least one drag link operatively interconnecting said first linkage and said second linkage; *and*
*at least one biasing member interconnecting said seatback frame and one of said first linkage and said second linkage, said biasing member operable to bias said head restraint toward an upright position;*
wherein said lower armature is operable to concurrently move each of said first linkage and said second linkage relative to said seatback frame in response to a predetermined force applied to said lower armature to thereby move said upper armature and move said head restraint toward the occupant.

11. A vehicle seat assembly comprising:
a seatback frame;
an upper armature including a head restraint;
a lower armature;
at least one first linkage moveably connected to said seatback frame at a first coupling point, operatively connected to said upper armature at a second coupling point, and operatively connected to said lower armature at a third coupling point, wherein said first coupling point and said third coupling point are disposed in spaced relation relative to each other; [and]
at least one second linkage moveably connected to said seatback frame at a fourth coupling point and operatively connected to said lower armature at a fifth coupling point, wherein said fourth coupling point and said fifth coupling point are disposed in spaced relation relative to each other; *and*
*at least one biasing member interconnecting said seatback frame and one of said first linkage and said second linkage, said biasing member operable to bias said head restraint toward an upright position;*
wherein said lower armature is operable to concurrently move each of said first linkage and said second linkage relative to said seatback frame in response to a predetermined force applied to said lower armature to thereby move said upper armature and move said head restraint toward the occupant.

*20. A vehicle seat assembly as set forth in claim 1 wherein the lower armature comprises a stiffener.*

*21. A vehicle seat assembly as set forth in claim 20 wherein the stiffener extends generally horizontally.*

*22. A vehicle seat assembly as set forth in claim 1 wherein the lower armature comprises at least one support.*

*23. A vehicle seat assembly as set forth in claim 22 wherein the at least one support comprises a plurality of supports.*

*24. A vehicle seat assembly as set forth in claim 22 wherein the seatback frame comprises upper and lower cross members; and*
*wherein the at least one support extends between the upper and lower cross members.*

*25. A vehicle seat assembly as set forth in claim 24 wherein the lower armature comprises a stiffener mechanically supporting the at least one support.*

*26. A vehicle seat assembly as set forth in claim 25 wherein the stiffener extends generally parallel to the lower cross member.*

*27. A vehicle seat assembly as set forth in claim 1 further comprising at least one support;*
*wherein the seatback frame comprises upper and lower cross members; and*
*wherein the at least one support extends between the upper and lower cross members.*

*28. A vehicle seat assembly as set forth in claim 27 wherein the at least one support is mounted to the second linkage and pivotally connected to the first linkage.*

*29. A vehicle seat assembly as set forth in claim 28 wherein said first linkage is moveably connected to said seatback frame at a first coupling point, is operatively connected to said upper armature at a second coupling point, and is operatively connected to said lower armature at a third coupling point, wherein said first coupling point and said third coupling point are disposed in spaced relation relative to each other and wherein the second coupling point is spaced apart from the first coupling point and oriented below the first coupling point.*

*30. A vehicle seat assembly as set forth in claim 29 wherein the third coupling point is oriented below first coupling point.*

*31. A vehicle seat assembly as set forth in claim 30 wherein said second linkage is moveably connected to said seatback frame at a fourth coupling point, and is operatively connected to said lower armature at a fifth coupling point, wherein said fourth coupling point and said fifth coupling point are disposed in spaced relation relative to each other, and wherein said drag link is pivotally connected to said second linkage at a sixth coupling point that is oriented below the fourth coupling point.*

*32. A vehicle seat assembly as set forth in claim 31 further comprising at least one impact body operable to move said lower armature in response to a predetermined force applied to said impact body thereby moving said head restraint toward the occupant;*
*wherein the seatback frame comprises a lower cross member; and*
*wherein the at least one impact body is disposed adjacent the lower cross member to be disposed proximate to a pelvic area and a lumbar area of an occupant.*

33. A vehicle seat assembly as set forth in claim 1 wherein said upper armature is operable to pivot said head restraint forward and upward.

34. A vehicle seat assembly as set forth in claim 5 wherein the second coupling point is spaced apart from the first coupling point and oriented below the first coupling point.

35. A vehicle seat assembly as set forth in claim 34 wherein the third coupling point is oriented below first coupling point.

36. A vehicle seat assembly as set forth in claim 35 wherein said second linkage is moveably connected to said seatback frame at a fourth coupling point, and is operatively connected to said lower armature at a fifth coupling point, wherein said fourth coupling point and said fifth coupling point are disposed in spaced relation relative to each other, and wherein said drag link is pivotally connected to said second linkage at a sixth coupling point that is oriented below the fourth coupling point.

37. A vehicle seat assembly as set forth in claim 36 further comprising at least one impact body operable to move said lower armature in response to a predetermined force applied to said impact body thereby moving said head restraint toward the occupant;
    wherein the seatback frame comprises a lower cross member; and
    wherein the at least one impact body is disposed adjacent the lower cross member to be disposed proximate to a pelvic area and a lumbar area of an occupant.

38. A vehicle seat assembly as set forth in claim 5 wherein the third coupling point is oriented below first coupling point.

39. A vehicle seat assembly as set forth in claim 38 wherein said second linkage is moveably connected to said seatback frame at a fourth coupling point, and is operatively connected to said lower armature at a fifth coupling point, wherein said fourth coupling point and said fifth coupling point are disposed in spaced relation relative to each other, and wherein said drag link is pivotally connected to said second linkage at a sixth coupling point that is oriented below the fourth coupling point.

40. A vehicle seat assembly as set forth in claim 39 further comprising at least one impact body operable to move said lower armature in response to a predetermined force applied to said impact body thereby moving said head restraint toward the occupant;
    wherein the seatback frame comprises a lower cross member; and
    wherein the at least one impact body is disposed adjacent the lower cross member to be disposed proximate to a pelvic area and a lumbar area of an occupant.

41. A vehicle seat assembly as set forth in claim 6 wherein said drag link is pivotally connected to said second linkage at a sixth coupling point that is oriented below the fourth coupling point.

42. A vehicle seat assembly as set forth in claim 41 further comprising at least one impact body operable to move said lower armature in response to a predetermined force applied to said impact body thereby moving said head restraint toward the occupant;
    wherein the seatback frame comprises a lower cross member; and
    wherein the at least one impact body is disposed adjacent the lower cross member to be disposed proximate to a pelvic area and a lumbar area of an occupant.

43. A vehicle seat assembly as set forth in claim 7 wherein the seatback frame comprises a lower cross member; and
    wherein the at least one impact body is disposed adjacent the lower cross member to be disposed proximate to a pelvic area and a lumbar area of an occupant.

44. A vehicle seat assembly as set forth in claim 7 wherein the at least one impact body comprises:
    a lower flange including a plurality of apertures formed therein;
    an upper flange including a plurality of apertures formed therein;
    a plurality of rods each extending through one of the apertures in the upper flange and one of the apertures in the lower flange; and
    an adjustment mechanism operable to adjust a curvature of the impact body.

45. A vehicle seat assembly as set forth in claim 11 wherein the second coupling point is spaced apart from the first coupling point and oriented below the first coupling point.

46. A vehicle seat assembly as set forth in claim 45 wherein the third coupling point is spaced apart from the first coupling point and oriented below the first coupling point.

47. A vehicle seat assembly as set forth in claim 46 wherein the seatback frame comprises upper and lower cross members; and
    wherein the vehicle seat assembly further comprises at least one support extending between the upper and lower cross members;
    wherein the at least one support is mounted to the second linkage and pivotally connected to the first linkage;
    wherein the at least one support is mounted to the second linkage at the fifth coupling point and the at least one support is pivotally connected to the first linkage at the third coupling point; and
    wherein the vehicle seat assembly further comprises at least one drag link operatively connected to the first linkage and operatively connected to the seatback frame to provide added stability to the armatures by providing an additional connection to the first linkage.

48. A vehicle seat assembly as set forth in claim 11 wherein the third coupling point is spaced apart from the first coupling point and oriented below the first coupling point.

49. A vehicle seat assembly as set forth in claim 48 wherein the seatback frame comprises upper and lower cross members; and
    wherein the vehicle seat assembly further comprises at least one support extending between the upper and lower cross members;
    wherein the at least one support is mounted to the second linkage and pivotally connected to the first linkage;
    wherein the at least one support is mounted to the second linkage at the fifth coupling point and the at least one support is pivotally connected to the first linkage at the third coupling point; and
    wherein the vehicle seat assembly further comprises at least one drag link operatively connected to the first linkage and operatively connected to the seatback frame to provide added stability to the armatures by providing an additional connection to the first linkage.

50. A vehicle seat assembly as set forth in claim 11 wherein the lower armature comprises at least one support.

51. A vehicle seat assembly as set forth in claim 50 wherein the at least one support comprises a plurality of supports.

52. A vehicle seat assembly as set forth in claim 11 wherein the lower armature comprises a stiffener.

53. A vehicle seat assembly as set forth in claim 52 wherein the stiffener extends generally horizontally.

54. A vehicle seat assembly as set forth in claim 50 wherein the seatback frame comprises upper and lower cross members; and
    wherein the at least one support extends between the upper and lower cross members.

55. A vehicle seat assembly as set forth in claim 54 wherein the at least one support is mounted to the second linkage and pivotally connected to the first linkage.

56. A vehicle seat assembly as set forth in claim 55 wherein the at least one support is mounted to the second linkage at the fifth coupling point and the at least one support is pivotally connected to the first linkage at the third coupling point.

57. A vehicle seat assembly as set forth in claim 55 further comprising at least one drag link operatively connected to the first linkage and operatively connected to the seatback frame to provide added stability to the armatures by providing an additional connection to the first linkage.

58. A vehicle seat assembly as set forth in claim 57 wherein the at least one drag link extends generally parallel with the at least one support.

59. A vehicle seat assembly as set forth in claim 50 wherein the lower armature further comprises a stiffener mechanically supporting the at least one support.

60. A vehicle seat assembly as set forth in claim 59 wherein the stiffener extends generally parallel to the lower cross member.

61. A vehicle seat assembly as set forth in claim 11 wherein the seatback frame comprises upper and lower cross members; and
   wherein the seat assembly further comprises at least one support extending between the upper and lower cross members;
   wherein the at least one support is mounted to the second linkage and pivotally connected to the first linkage;
   wherein the at least one support is mounted to the second linkage at the fifth coupling point and the at least one support is pivotally connected to the first linkage at the third coupling point; and
   wherein the seat assembly further comprises at least one drag link operatively connected to the first linkage and operatively connected to the seatback frame to provide added stability to the armatures by providing an additional connection to the first linkage.

62. A vehicle seat assembly as set forth in claim 61 wherein the at least one drag link extends generally parallel with the at least one support.

63. A vehicle seat assembly as set forth in claim 11 wherein said upper armature is operable to pivot said head restraint forward and upward.

64. A vehicle seat assembly as set forth in claim 13 wherein said drag link is pivotally connected to said second linkage at a sixth coupling point that is oriented below the fourth coupling point.

65. A vehicle seat assembly as set forth in claim 16 wherein the at least one impact body comprises:
   a lower flange including a plurality of apertures formed therein;
   an upper flange including a plurality of apertures formed therein;
   a plurality of rods each extending through one of the apertures in the upper flange and one of the apertures in the lower flange; and
   an adjustment mechanism operable to adjust a curvature of the impact body.

66. A vehicle seat assembly as set forth in claim 16 wherein the seatback frame comprises a lower cross member; and
   wherein the at least one impact body is disposed adjacent the lower cross member to be disposed proximate to a pelvic area and a lumbar area of an occupant.

67. A vehicle seat assembly comprising:
   a seatback frame;
   an upper armature including a head restraint;
   a lower armature;
   at least one first linkage moveably connected to said seatback frame, operatively connected to said upper armature, and operatively connected to said lower armature;
   at least one second linkage moveably connected to said seatback frame and operatively connected to said lower armature; and
   at least one drag link operatively interconnecting said first linkage and said second linkage;
   wherein said lower armature is operable to concurrently move each of said first linkage and said second linkage relative to said seatback frame in response to a predetermined force applied to said lower armature to thereby move said upper armature and move said head restraint toward the occupant; and
   wherein said upper armature is fixedly connected to said first linkage.

68. A vehicle seat assembly as set forth in claim 67, wherein said upper armature is welded to said first linkage.

69. A vehicle seat assembly comprising:
   a seatback frame;
   an upper armature including a head restraint;
   a lower armature;
   at least one first linkage moveably connected to said seatback frame at a first coupling point, operatively connected to said upper armature at a second coupling point, and operatively connected to said lower armature at a third coupling point, wherein said first coupling point and said third coupling point are disposed in spaced relation relative to each other; and
   at least one second linkage moveably connected to said seatback frame at a fourth coupling point and operatively connected to said lower armature at a fifth coupling point, wherein said fourth coupling point and said fifth coupling point are disposed in spaced relation relative to each other;
   wherein said lower armature is operable to concurrently move each of said first linkage and said second linkage relative to said seatback frame in response to a predetermined force applied to said lower armature to thereby move said upper armature and move said head restraint toward the occupant; and
   wherein said upper armature is fixedly connected to said first linkage at said second coupling point.

70. A vehicle seat assembly as set forth in claim 69, wherein said upper armature is welded to said first linkage.

* * * * *